(12) United States Patent
Aughey et al.

(10) Patent No.: US 9,632,677 B2
(45) Date of Patent: Apr. 25, 2017

(54) SYSTEM AND METHOD FOR NAVIGATING A 3-D ENVIRONMENT USING A MULTI-INPUT INTERFACE

(75) Inventors: John H. Aughey, Saint Louis, MO (US); David D. Fries, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1276 days.

(21) Appl. No.: 13/039,284

(22) Filed: Mar. 2, 2011

(65) Prior Publication Data

US 2012/0223936 A1    Sep. 6, 2012

(51) Int. Cl.
| | |
|---|---|
| *G06T 15/00* | (2011.01) |
| *G06F 3/0484* | (2013.01) |
| *G06F 3/0481* | (2013.01) |
| *G06F 3/0488* | (2013.01) |
| *G06T 19/00* | (2011.01) |

(52) U.S. Cl.
CPC ........ *G06F 3/04845* (2013.01); *G06F 3/0488* (2013.01); *G06F 3/04815* (2013.01); *G06T 19/00* (2013.01); *G06F 2203/04808* (2013.01)

(58) Field of Classification Search
CPC ... G06T 19/00; G06F 3/04815; G06F 3/0488; G06F 3/04883; G06F 3/041
See application file for complete search history.

(56) References Cited

U.S. PATENT DOCUMENTS

| 8,451,268 B1 * | 5/2013 | Reisman et al. ............ 345/419 |
| 2010/0045666 A1 | 2/2010 | Kommann et al. |
| 2010/0146389 A1 * | 6/2010 | Yoo et al. .................... 715/702 |
| 2011/0069019 A1 * | 3/2011 | Carpendale et al. ........ 345/173 |
| 2011/0164029 A1 * | 7/2011 | King et al. .................. 345/419 |

FOREIGN PATENT DOCUMENTS

| CA | WO2011003171 A1 | 1/2011 |
| JP | 2007-328570 | 12/2007 |
| JP | 2009-131436 | 6/2009 |
| JP | 2012-501016 | 1/2012 |

OTHER PUBLICATIONS

International Search Report and the Written Opinion of the International Searching Authority mailed on Sep. 3, 2013 for PCT Application No. PCT/US2012/022412 filed on Jan. 24, 2012—International Searching Authority—European Patent Office.
Kyung M-H et al: "A New Approach to Through-the-Lens Camera Control", CVGIP Graphical Models and Image Processing. Academic Press, Duluth, MA, US, vol. 58, No. 3, May 1, 1996 (May 1, 1996), pp. 262-285, XP004418993. ISSN: 1077-3169, DOI: 10.1006/GMIP.1996.0022 p. 263, col. 1; figure 1 p. 272-273, chapters 4.1 and 4.2.

(Continued)

*Primary Examiner* — Tize Ma
(74) *Attorney, Agent, or Firm* — McDonnell Boehnen Hulbert & Berghoff LLP

(57) ABSTRACT

A system and method for 3-D environment manipulation is disclosed. A vector extrapolator is configured to extrapolate an input into a 3-D space to establish a 3-D vector extrapolation. A perspective locator is configured to relocate a viewing perspective based on the 3-D vector extrapolation.

22 Claims, 12 Drawing Sheets

(56) References Cited

OTHER PUBLICATIONS

Jason L. Reisman et al: "A screen-space formulation for 2D and 3D direct manipulation", Proceedings of the 22nd Annual ACM Symposium on User Interface Software and Technology, UIST '09, Jan. 1, 2009 (Jan. 1, 2009), p. 69, XP55026031, New York, New York, USA DOI: 10.1145/1622176.1622190 ISBN: 978-1-60-558745-5 p. 70, chapter 3; figures 1, 9-12.
English Translation of Notification of First Office Action issued in Chinese Patent Application No. 201280010753.X dated Nov. 12, 2015.
English translation of Notice of Reasons for Rejection issued in Japanese Patent Application No. 2013-556624 issued Mar. 8, 2016.
Kaoru Sugita, et al., Remote Display Control Systems Making Use of Transparent Touch Panels, Multimedia, Dispersion, Cooperation and Mobile (DOCOMO 2009), Collection of Symposium Writings, Japan, Information Processing Society of Japan, Jul. 8, 2009, vol. 2009, No. 1, pp. 679-686.

\* cited by examiner

SYSTEM AND METHOD FOR NAVIGATING A 3-D ENVIRONMENT USING A MULTI-INPUT INTERFACE

FIELD

Embodiments of the present disclosure relate generally to viewing systems and methods. More particularly, embodiments of the present disclosure relate to interactive viewing systems and methods.

BACKGROUND

Many application areas such as military mapping, video and computer games, medical visualization, and user interfaces utilize a 3-dimensional (3-D) environment. Generally, a 3-D environment provides a mono-vision or stereoscopic perspective view of a 3-D object, collection of objects, region, or space.

SUMMARY

A system and method for 3-D environment manipulation is disclosed. A vector extrapolator extrapolates an input into a 3-D space to provide a 3-D vector extrapolation. A perspective locator relocates a viewing perspective based on the 3-D vector extrapolation.

In an embodiment, a method for multi-input 3-D environment navigation extrapolates a first input into a 3-D space to provide a first 3-D vector extrapolation. The method further relocates a viewing perspective based on a second 3-D vector extrapolation calculated based on the first 3-D extrapolation In another embodiment, a multi-input 3-D environment device comprises an interface that receives a first input. The device further comprises a vector extrapolator that extrapolates the first input into a first 3-D space to provide a 3-D vector extrapolation. The device also comprises a perspective locator that relocates a viewing perspective based on a second 3-D vector extrapolation calculated based on the first 3-D vector extrapolation.

In yet another embodiment, a 3-D environment manipulation system comprises a vector extrapolator operable to extrapolate an input into a 3-D space to provide a 3-D vector extrapolation. The system further comprises a perspective locator operable to relocate a viewing perspective based on the 3-D vector extrapolation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
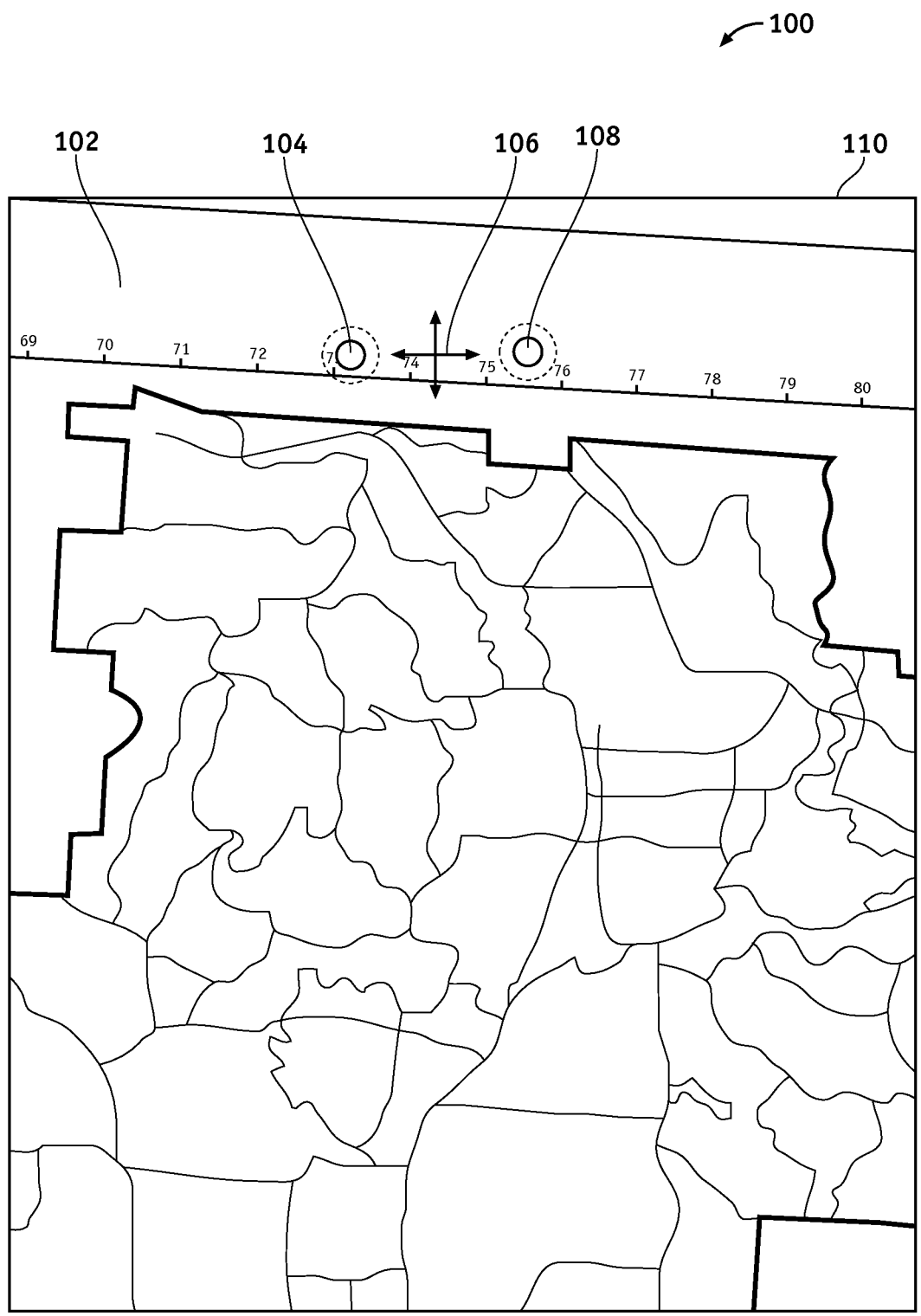
FIG. 1 is an illustration of an exemplary 2-D environment navigation in a first position.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to 3-D software simulation, touch sensitive screens, imaging techniques, computing virtual camera location, three dimensional model generation, human-machine interaction and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, landscape simulation. Embodiments of the disclosure, however, are not limited to such landscape simulation applications, and the techniques described herein may also be utilized in other applications. For example but without limitation, embodiments may be applicable to combat information centers, underwater navigation, construction, mining and petroleum engineering, electronic games, scientific visualization, user interfaces, interacting with architectural models, computed aided drafting systems, or any environment represented as a three dimensional model, and the like. Moreover, embodiments of the disclosure are applicable to, for example but without limitation, navigating through virtual training facilities comprising ground terrain, buildings, foliage, and other physical structures.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide an intuitive way to navigate through a 3-D environment using a multi-touch interface. A desired "feeling" is for a person interacting with a displayed 3-D model to feel like they are manipulating the actual model being viewed. This is accomplished by the embodiments using a 3-D model and physical touch points on a multi-touch surface to determine an original location/point on the 3-D model. The original location/point on the 3-D model is where the touch points (e.g., 2-D touch points A and B in FIG. 10) intersect at originally intersected points (e.g., virtual touch points $P_0$ and $P_1$ in FIG. 10). Then, as the touch points are dragged around on the multi-touch surface, the 3-D model is manipulated to keep the originally intersected points under those touch points. In this manner, a view of the 3-D environment is manipulated such that the original location/point on the 3-D model under each finger/input remains under that finger/input as they are moved on the multi-touch surface as explained in more detail below.

In contrast to existing solutions, an important part of an embodiment of the disclosure is a way the 3-D model and the touch points are used together to manipulate the view of the 3-D model. The view of the 3-D model is manipulated such that the original location(s) that are touched on the 3-D model under the fingers/input of an operator remains under that finger/input as they are moved on the multi-touch surface. Existing solutions may manipulate a view of the 3-D model by performing a relative movement of the view in response to multi-touch interaction without using an actual 3-D environment as a constraint for manipulating the view. An example is performing a left to right motion on a multi-touch surface and rotating the view one degree for each inch of touch movement.

Existing solutions for multi-touch surfaces allow navigation through a 2-dimensional (2-D) environment. In contrast, embodiments of the disclosure extend 2-D navigation gestures for use in a 3-D virtual environment. In this manner, by using a set of single and/or multi-finger/multi-input intuitive gestures on a multi-touch surface, an operator/user can navigate in the 3-D virtual environment rather than in the 2-D environment provided by the existing solutions.

When the user touches a point on the multi-touch surface, a system according to an embodiment of the disclosure uses contents of the 3-D virtual environment to determine 3-D locations in a 3-D virtual space that the user is touching within the 3-D virtual environment. Using these 3-D locations (3-D points) in the 3-D virtual space, the system translates the user touches/gestures into translation, rotation, and zoom navigation to navigate a scene in relationship to these 3-D locations. For example, a single finger pan will translate the 3-D virtual environment so that a 3-D point that is being touched remains under the finger/input device at all times. In this document touch point and location may be used interchangeably.

FIG. 1 is an illustration of an exemplary 2-D environment navigation 100 in a first position. A display 110 (e.g., a multi-touch interface) comprises a map 102. A first touch is made on a first touch point 104 and a second touch is made on a second touch point 108. An activation indicator 106 indicates a presence of both the first touch point 104 and the second touch point 108 thus activating a 2-D map navigation mode. In the 2-D map navigation mode, at least one of the first touch point 104 and the second touch point 108 can be used to manipulate the map 102. The first touch point 104 and the second touch point 108 can also be used in a pinch gesture to move the first touch point 104 and the second touch point 108 towards or away from a common center point. A one touch is required to translate, and two touches in a conventional case is the pinch gesture, which also generally implies that the first touch point 104 and the second touch point 108 are going towards or away from the common center point.

A multi-touch interface comprises a surface upon which an image is rendered and a device capable of sensing physical touches. The rendering surface may be implemented by a projector that projects an image onto a diffuse surface, or a non-projected display system such as a liquid crystal display (LCD) or plasma monitor. A device capable of sensing physical touches may comprise, for example but without limitation, a camera based system, a capacitive touchscreen, or other technology that can sense a physical location of a physical touch/input on an imaging surface.

Figure 2:
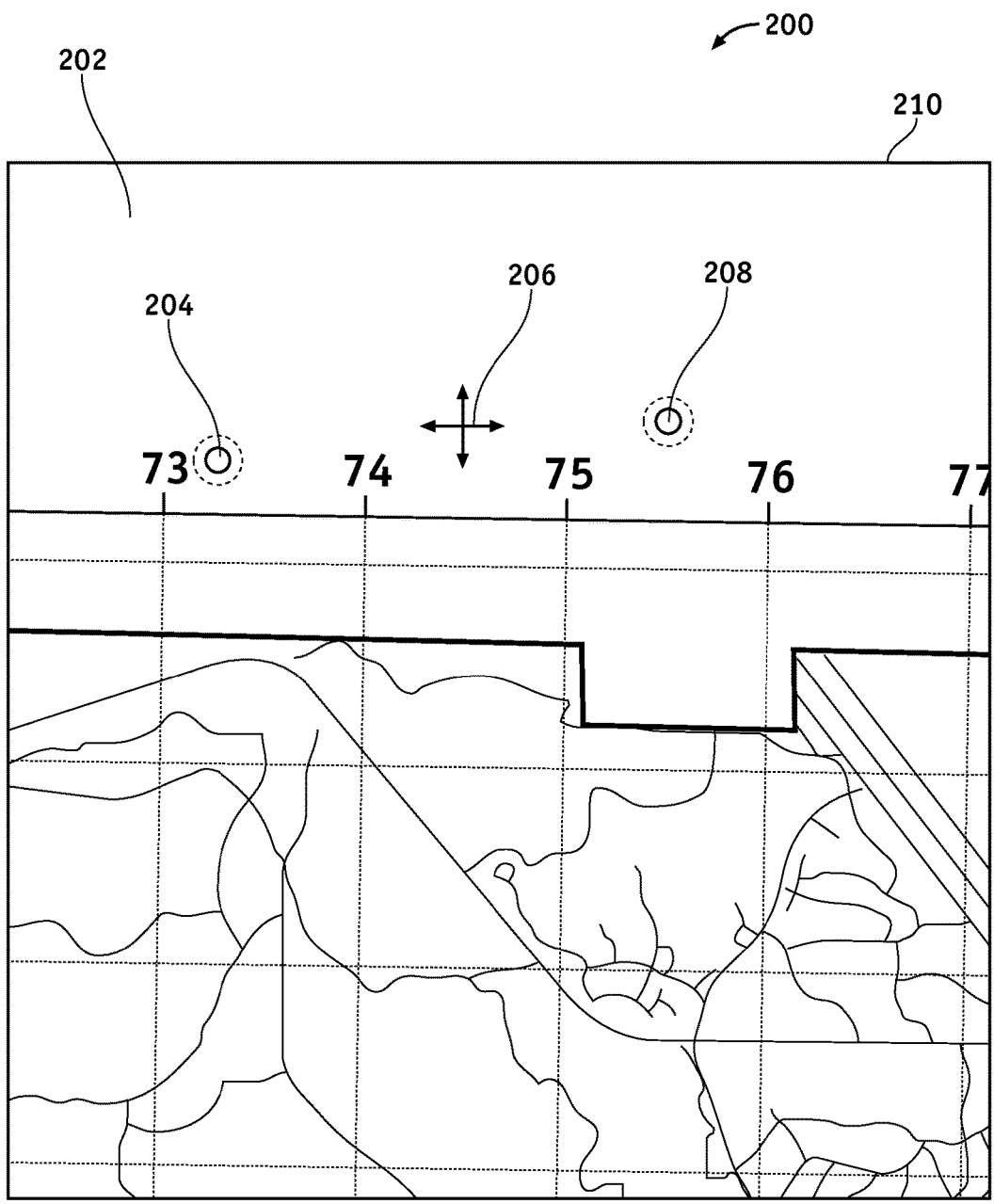
FIG. 2 is an illustration of the exemplary 2-D environment navigation of FIG. 1 in a second position showing an expanded view using a multi-touch pinch gesture.

FIG. 2 is an illustration of the exemplary 2-D environment navigation 100 of FIG. 1 in a second position 200 showing an expanded view. A display 210 comprises the map 102 of FIG. 2 at a zoomed map view 202. By moving the first touch from the first touch point 104 to a first moved touch point 204 and moving the second touch from the second touch point 108 to a second moved touch point 208, a proportional zoom is made to the zoomed map view 202. Manipulation of the zoomed map view 202 may continue until either the first touch or the second touch is released.

A 3-D environment is a virtual representation of a 3-D physical space. The 3-D environment is typically represented as polygons positioned in a 3-D space. These polygons are arranged to approximate objects such as buildings and earth terrain and are typically colored and textured to appear realistic when rendered on a computer display.

A view of the 3-D environment comprises a position, orientation, and frustum (a viewing frustum) of a virtual camera placed in the 3-D environment through which the 3-D environment is rendered. The rendering maps the 3-D environment to a 2-D plane, suitable for display on a 2-D surface such as a projector or a computer screen. A frustum of the view is an orthographic or perspective projection through which a scene (e.g., map) is rendered. This perspective projection can be conceptualized as a field of view or zoom of the virtual camera. A frustum is also a portion of a virtual solid (e.g., a cone or pyramid) that lies between two parallel planes intersecting the virtual solid. Frustum is commonly used in computer graphics to describe a 3-D region visible on a display screen.

Figure 3:
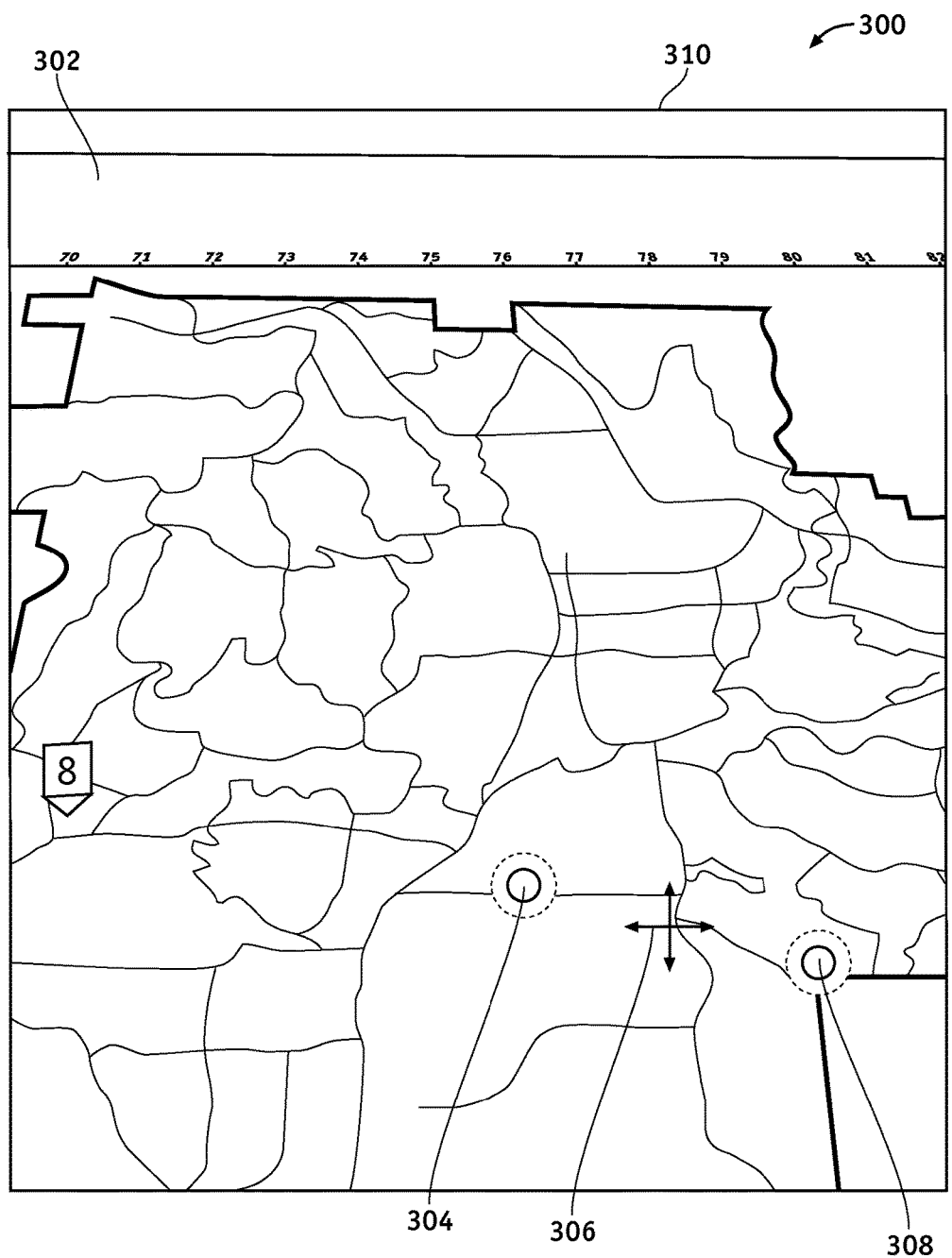
FIG. 3 is an illustration of an exemplary 3-D environment navigation in a first position according to an embodiment of the disclosure.

FIG. 3 is an illustration of an exemplary 3-D environment navigation 300 in a first position according to an embodiment of the disclosure. A display 310 (e.g., a multi-touch interface) comprises a map 302. A first touch is made on a first touch point 304 and a second touch is made on a second touch point 308. An activation indicator 306 indicates a presence of both the first touch point 304 and the second touch point 308 thus activating a map 3-D manipulation mode. In the map 3-D manipulation mode, the first touch point 304 and the second touch point 308 are used to manipulate the map 302 in 3 dimensions. The manipulation may comprise, for example but without limitation, a 3-D rotation, a 3-D translation, a 3-D resizing, and the like.

Since the map 302 in this example is a simple flat rectangle, the manipulation keeps the map 302 in the same plane as a surface of the map 302. While in this example the map 302 is used as a manipulated object, any visual object, such as but without limitation, computer aided design (CAD) objects, gaming environments, mathematical constructs, simulated natural environments, and the like, may be used as the manipulated object.

Figure 4:
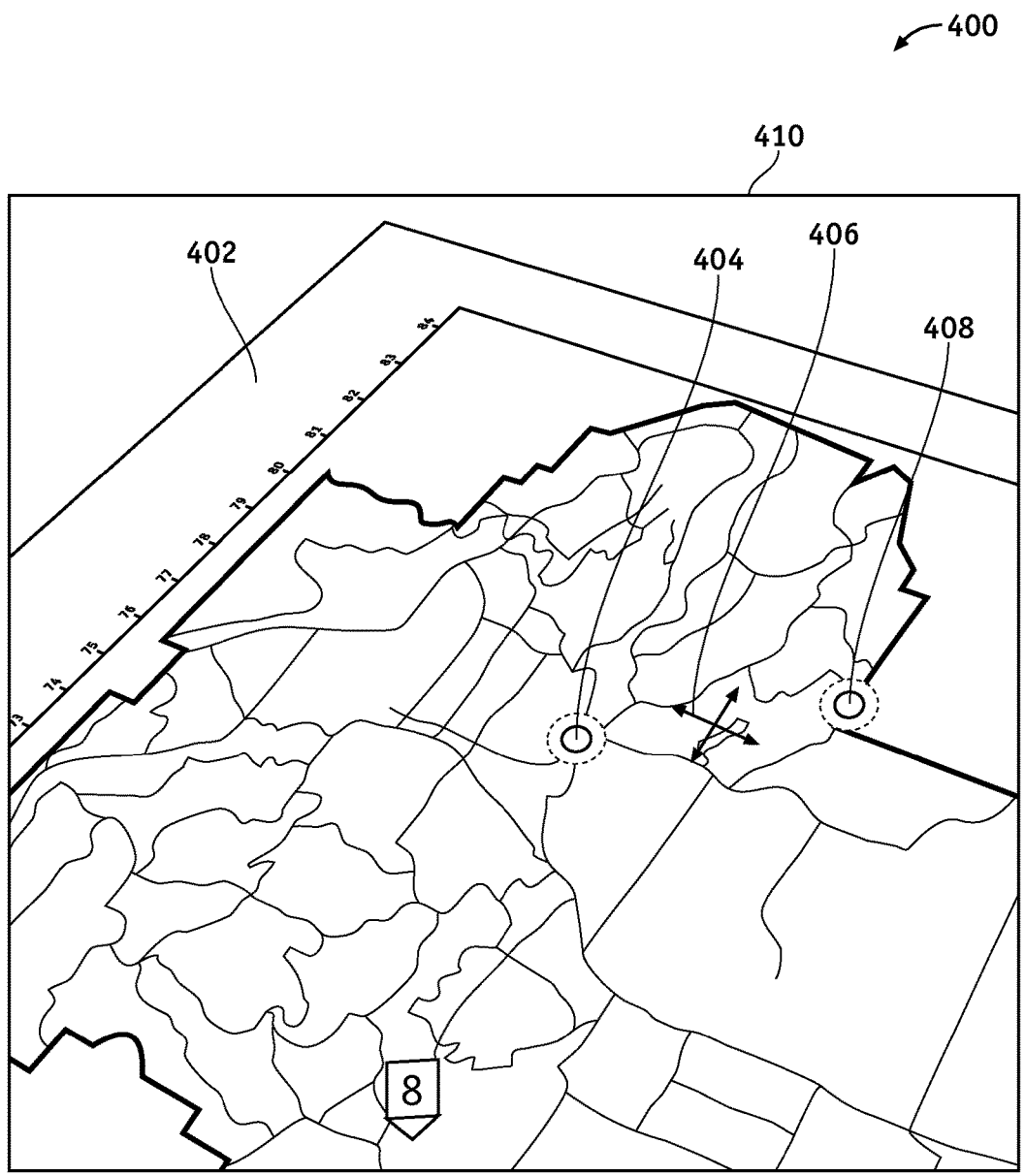
FIG. 4 is an illustration of the exemplary 3-D environment navigation of FIG. 3 in a second position according to an embodiment of the disclosure.

FIG. 4 is an illustration of the exemplary 3-D environment navigation 300 in a second position 400 according to an embodiment of the disclosure. A display 410 comprises the map 302 (FIG. 3) at a manipulated view 402. By moving the first touch from the first touch point 304 to a first moved touch point 404 and moving the second touch from the second touch point 308 to a second moved touch point 408, a manipulation is made to a view of the manipulated object (map 302) resulting in the manipulated view 402. An activation indicator 406 indicates a presence of both the first moved touch point 404 and a second moved touch point 408. The manipulated view 402 comprises, for example but without limitation, a 3-D rotation, a 3-D translation, a 3-D resizing, and the like, of the map 302. Manipulation of the manipulated view 402 may continue until either the first touch or the second touch is released.

Figure 5:
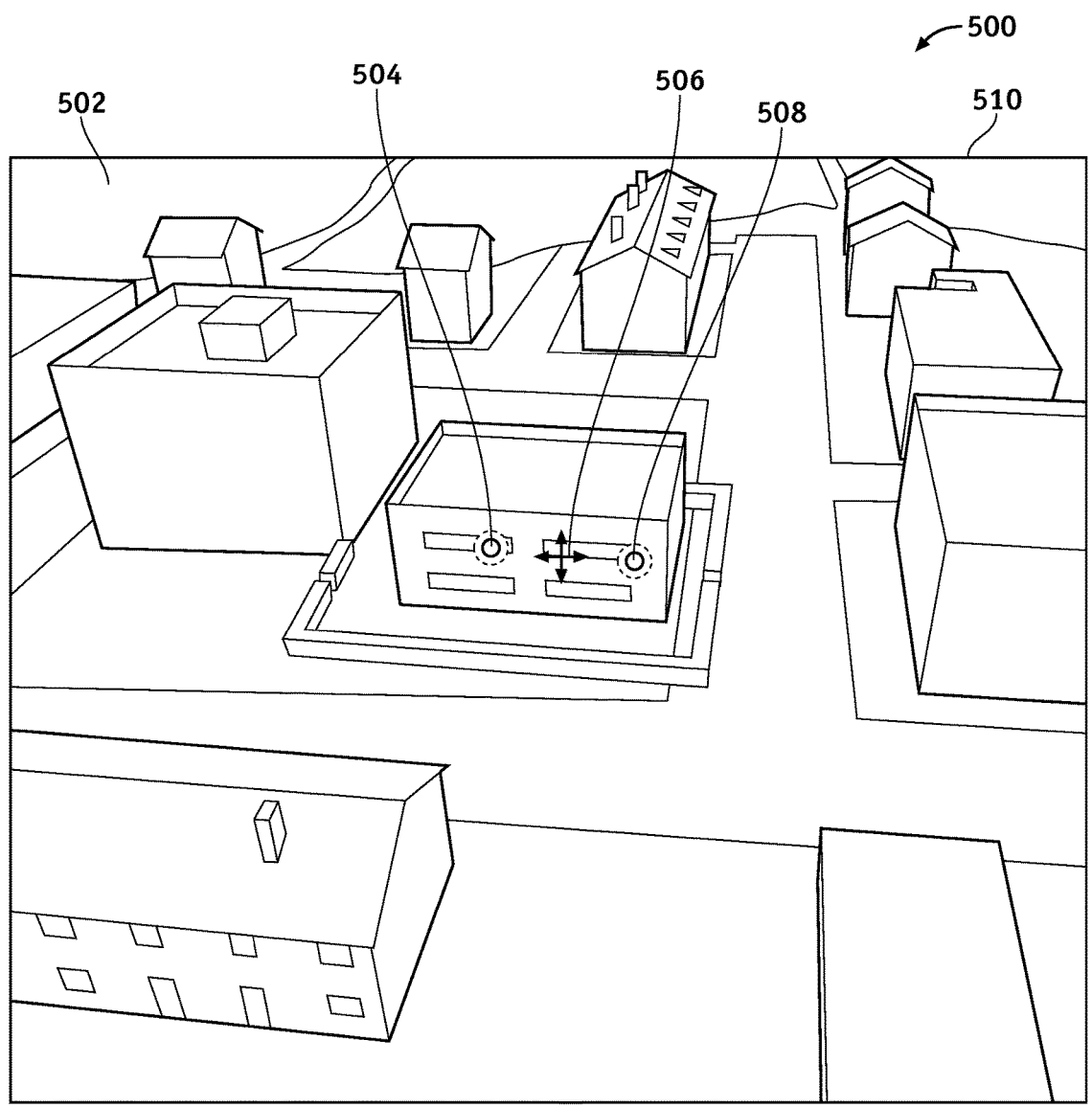
FIG. 5 is an illustration of an exemplary 3-D environment navigation in a first position according to an embodiment of the disclosure.

FIG. 5 is an illustration of an exemplary 3-D environment navigation 500 in a first position according to an embodiment of the disclosure. A display 510 comprises a map 502. A first touch is made on a first touch point 504 and a second touch is made on a second touch point 508. An activation indicator 506 indicates a presence of both the first touch point 504 and the second touch point 508 thus activating a map 3-D manipulation mode. In the map 3-D manipulation mode, the first touch point 504 and the second touch point 508 can be used to manipulate the map 502 in 3-D. The manipulation may comprise, for example but without limitation, a 3-D rotation, a 3-D translation, a 3-D resizing, and the like.

Figure 6:
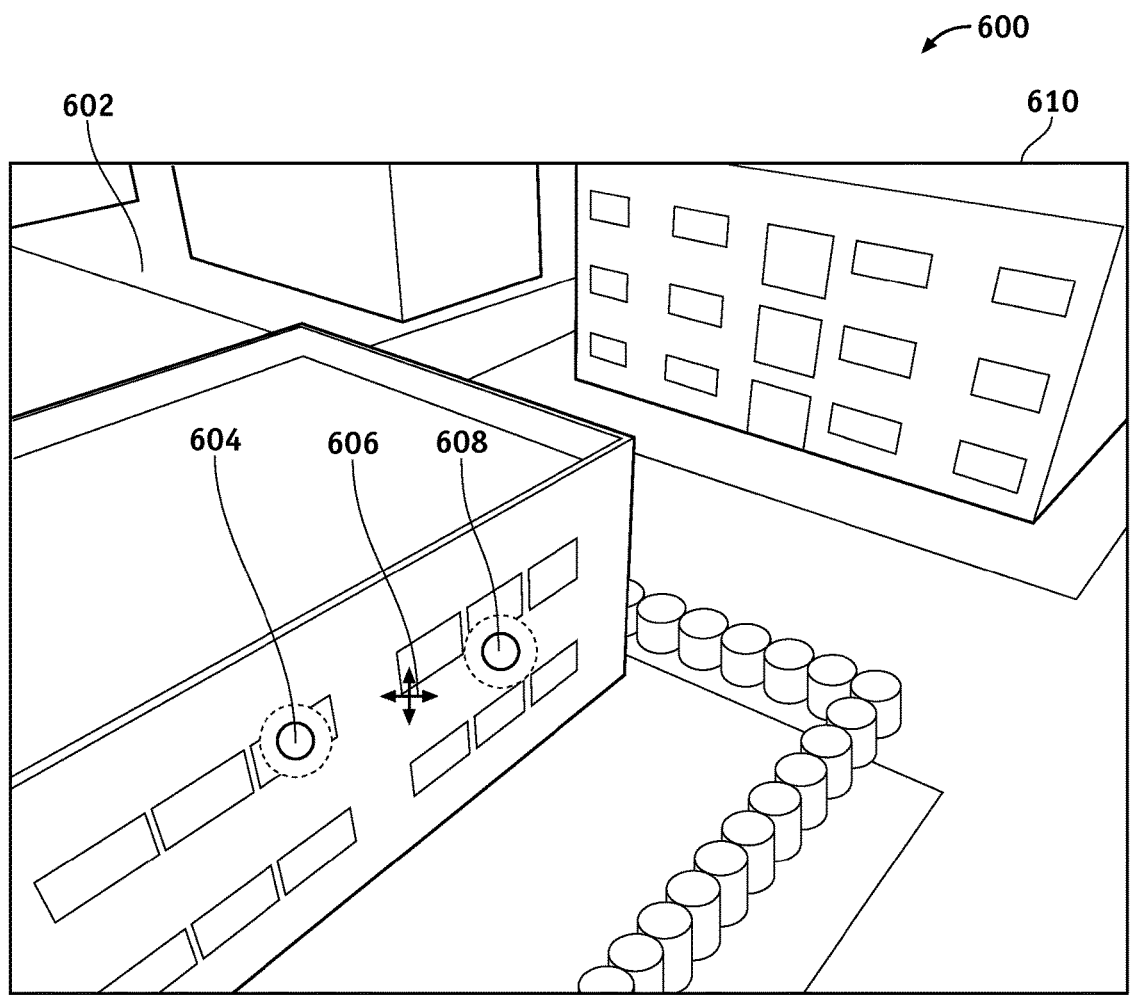
FIG. 6 is an illustration of the exemplary 3-D environment navigation of FIG. 5 in a second position according to an embodiment of the disclosure.

FIG. 6 is an illustration of the exemplary 3-D environment navigation of FIG. 5 in a second position 600 according to an embodiment of the disclosure. A display 610 comprises the map 502 at a manipulated view 602. By moving the first touch from the first touch point 504 to a first moved touch point 604 and moving the second touch from the second touch point 508 to a second moved touch point 608, a manipulation is made to the manipulated view 602. The manipulated view 602 comprises a 3-D rotation, a 3-D translation, and a 3-D resizing of the map 502. Manipulation of the manipulated view 602 may continue until either the first touch or the second touch is released. A location on the 3-D model under a user finger/input stays under the user finger/input after a manipulation. In this manner, a 2-D navigation gesture is extended for use in the 3-D virtual environment as explained in more detail below in context of discussion of FIG. 8.

Figure 7:
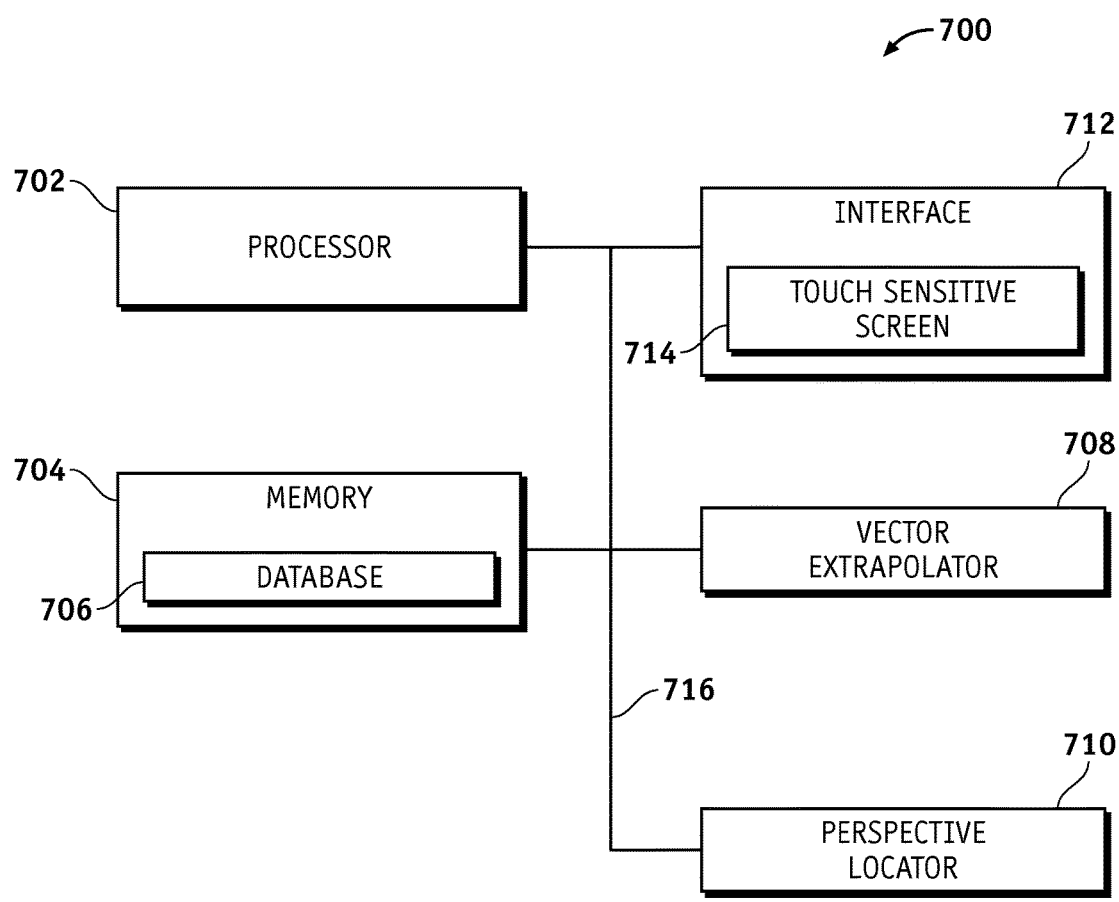
FIG. 7 is an illustration of an exemplary functional block diagram of a multi-touch 3-D environment navigation system according to an embodiment of the disclosure.

FIG. 7 is an illustration of an exemplary multi-touch 3-D environment navigation system 700 (system 700) according to an embodiment of the disclosure. The system 700 uses a set of single and/or multi-finger intuitive gestures, allowing an operator/user to navigate a scene in 3 dimensions.

The system 700 may comprise, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment. The system 700 generally comprises a processor 702, a memory 704, a database 706, a vector extrapolator 708, a perspective locator 710, and an interface 712. These components may be coupled to and communicate with each other via a network bus 716.

The processor 702 comprises processing logic that is configured to carry out the functions, techniques, and processing tasks associated with the operation of the system 700. In particular, the processing logic is configured to support the system 700 described herein. For example, the processor 702 controls the interface 712, the vector extrapolator 708, and the perspective locator 710 to extend the 2-D navigation gestures/input received by the interface 712 for use in the 3-D virtual environment as explained in more detail below in the context of discussion of FIG. 8.

The processor 702 also accesses data stored in the database 706 to support functions of the system 700. In this manner, the processor 702 enables a single finger pan/input translating the 3-D environment so that the 3-D point that is being touched/activated remains under the finger/input at all times. The data may comprise, for example but without limitation, coordinates of a touched object, current virtual camera location, virtual camera vector extrapolation information, 3-D polygon positions, how the 3-D polygon are connected together, image texture data, texture metadata, terrain representations (e.g., buildings, trees, ground, map) displayed in a 3-D environment, and the like.

The processor 702 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory 704 may be a data storage area with memory formatted to support the operation of the system 700. The memory 704 is configured to store, maintain, and provide data as needed to support the functionality of the system 700 in the manner described below. In practical embodiments, the memory 704 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory 704 may be coupled to the processor 702 and configured to store, for example but without limitation, the database 706, and the like. Additionally, the memory 704 may represent a dynamically updating database containing a table for updating the database 706, and the like. The memory 704 may also store, a computer program that is executed by the processor 702, an operating system, an application program, tentative data used in executing a program, and the like.

The memory 704 may be coupled to the processor 702 such that the processor 702 can read information from and write information to the memory 704. As an example, the processor 702 and memory 704 may reside in respective application specific integrated circuits (ASICs). The memory 704 may also be integrated into the processor 702. In an embodiment, the memory 704 may comprise a cache memory for storing temporary variables or other intermediate information during execution of instructions to be executed by the processor 702. The memory 704 comprises the database 706.

The database 706 may comprise, for example but without limitation, a hierarchical database, a terrain database, a network database, a relational database, an object oriented database, and the like. The database 706 is operable to store, for example but without limitation, coordinates, algorithms, methodologies, and the like, that may be used in the system 700. The database 706 may be used in various ways, for example but without limitation, to use the current virtual camera location and virtual camera vector extrapolation information as a vector to perform an intersection test with the terrain database to determine where a user touched a terrain area, and the like.

The vector extrapolator 708 extrapolates a touch into a 3-D space to provide a 3-D vector extrapolation as explained in more detail below.

The perspective locator 710 relocates a viewing perspective based on the 3-D vector extrapolation as explained in more detail below.

The interface 712 (user interface) communicates with an operator/user of the system 700. The interface 712 may also provide an internet webpage interface. The interface 712 may comprise, for example but without limitation, an interface to a map, an interface to a 3-D environment, and the like, as explained in more detail below.

The interface 712 may further comprise a multi-touch surface such as a touch sensitive screen 714. When the user touches a 2-D point on the touch sensitive screen 714, the system 700 uses contents of the 3-D virtual environment to determine 3-D locations in a 3-D virtual space that the user is touching within the 3-D virtual environment. Using these 3-D locations (3-D points) in the 3-D virtual space, the system 700 translates the user touches/gestures into translation, rotation, and zoom navigation to navigate a scene in relationship to these 3-D locations. For example, as mentioned above, a single finger pan will translate the 3-D virtual environment such that a 3-D point that is being touched on the touch sensitive screen 714 remains under a location of the touch/input at all times.

The touch sensitive screen 714, may comprise, for example but without limitation, a plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front vector extrapolation display, a rear vector extrapolation display, and a micro-electromechanical device (MEM) display such as a digital micro-mirror device (DMD) display or a grating light valves (GLV) display, a cathode ray tube (CRT), and the like. The touch sensitive screen may further comprise organic display technologies such as an organic electroluminescent (OEL) display and an organic light emitting diode (OLED) display, as well as a light emitting polymer display, and the like.

Figure 8:
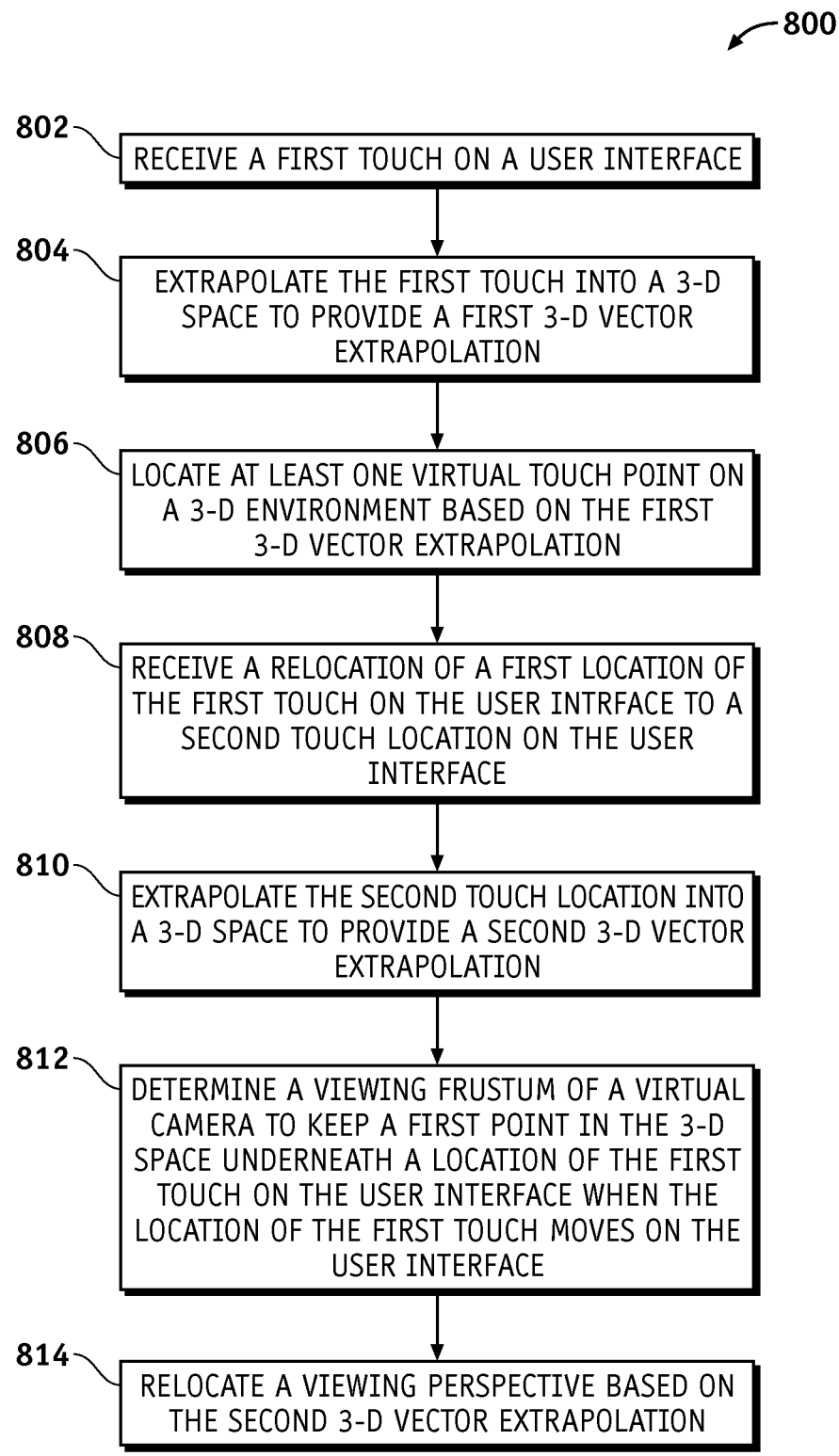
FIG. 8 is an illustration of an exemplary flowchart showing a multi-touch 3-D environment navigation process according to an embodiment of the disclosure.

FIG. 8 is an illustration of an exemplary flowchart showing a multi-touch/multi-input 3-D environment navigation process 800 according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 3-7. In practical embodiments, portions of the process 800 may be performed by different elements of the system 700 such as: the processor 702, the memory 704, the database 706, the vector extrapolator 708, the perspective locator 710, the interface 712, and the network bus 716. Process 800 may have functions, material, and structures that are similar to the embodiments shown in FIGS. 3-7. Therefore common features, functions, and elements may not be redundantly described here.

Figure 9:
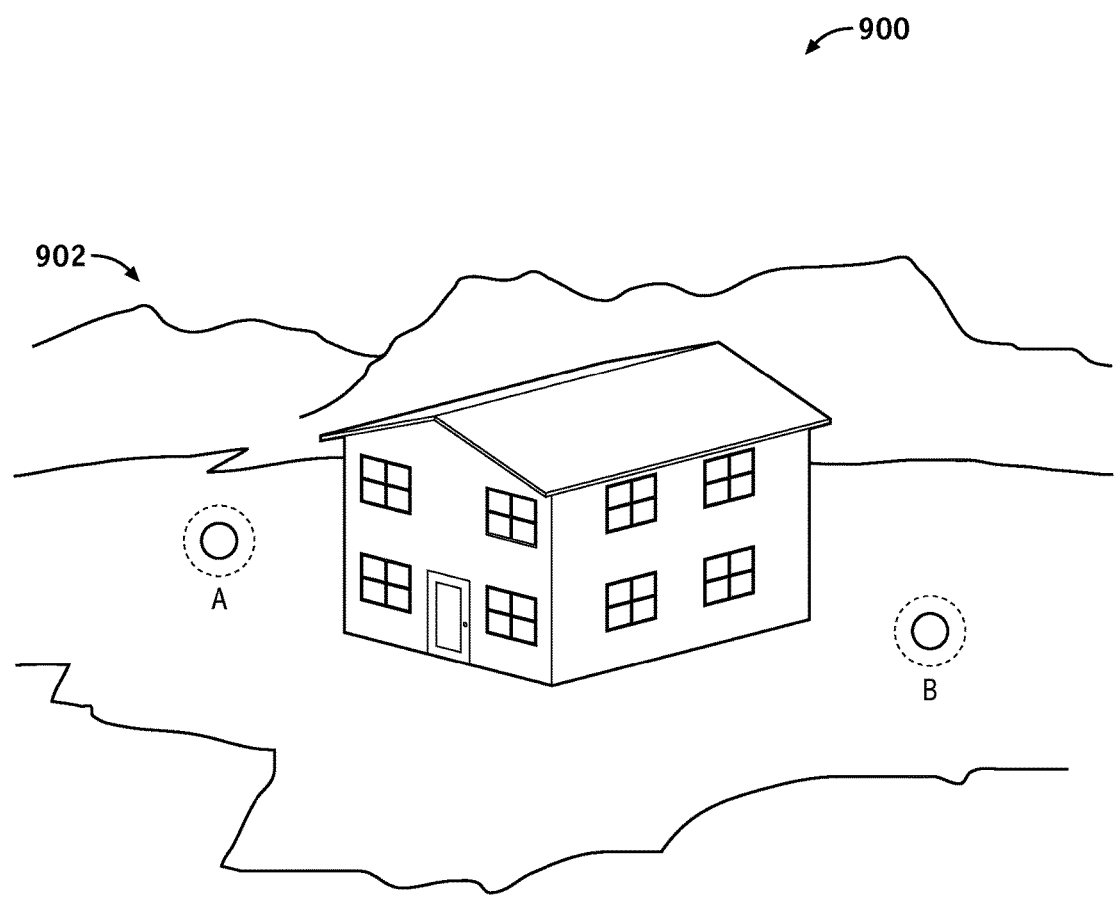
FIG. 9 is an illustration of an exemplary two point multi-touch in a 3-D environment according to an embodiment of the disclosure.
Figure 10:
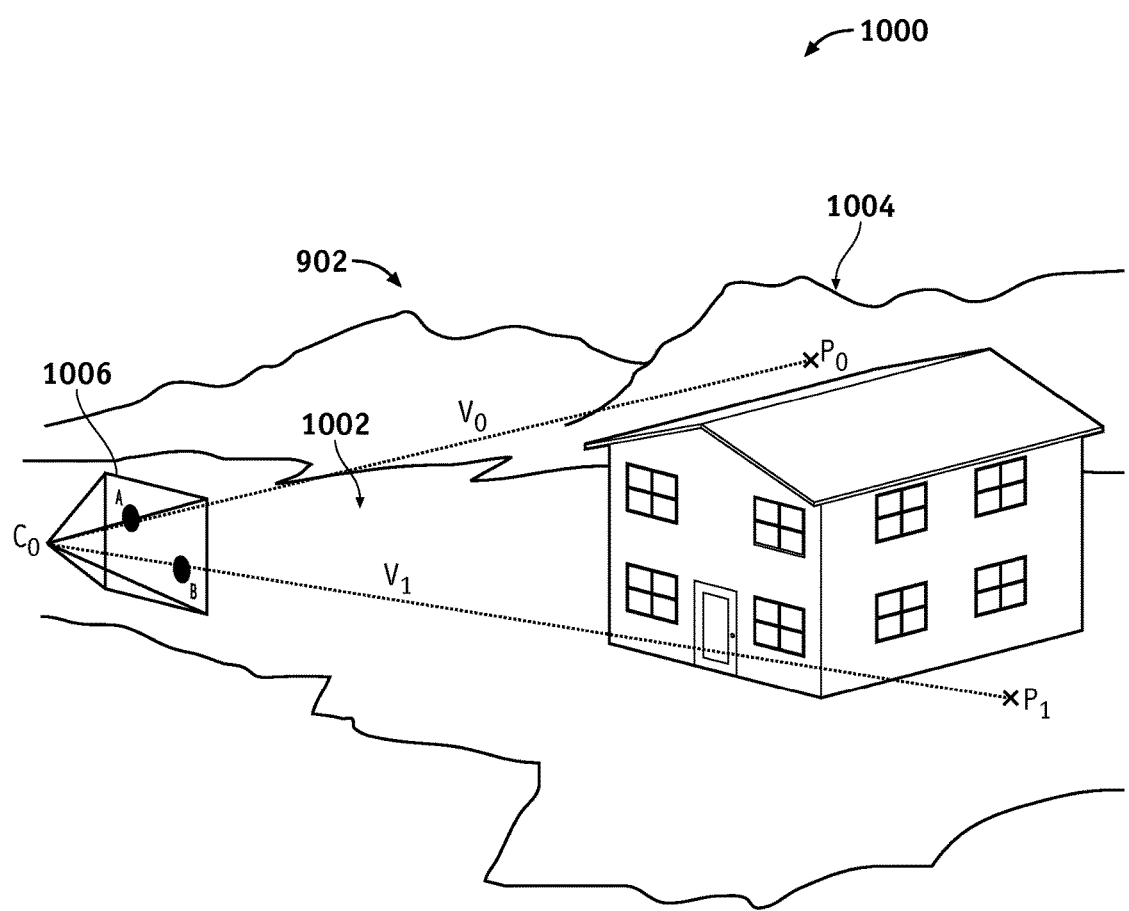
FIG. 10 is an illustration of an exemplary two point vector extrapolation from a multi-touch interface in a 3-D environment according to an embodiment of the disclosure.
Figure 11:
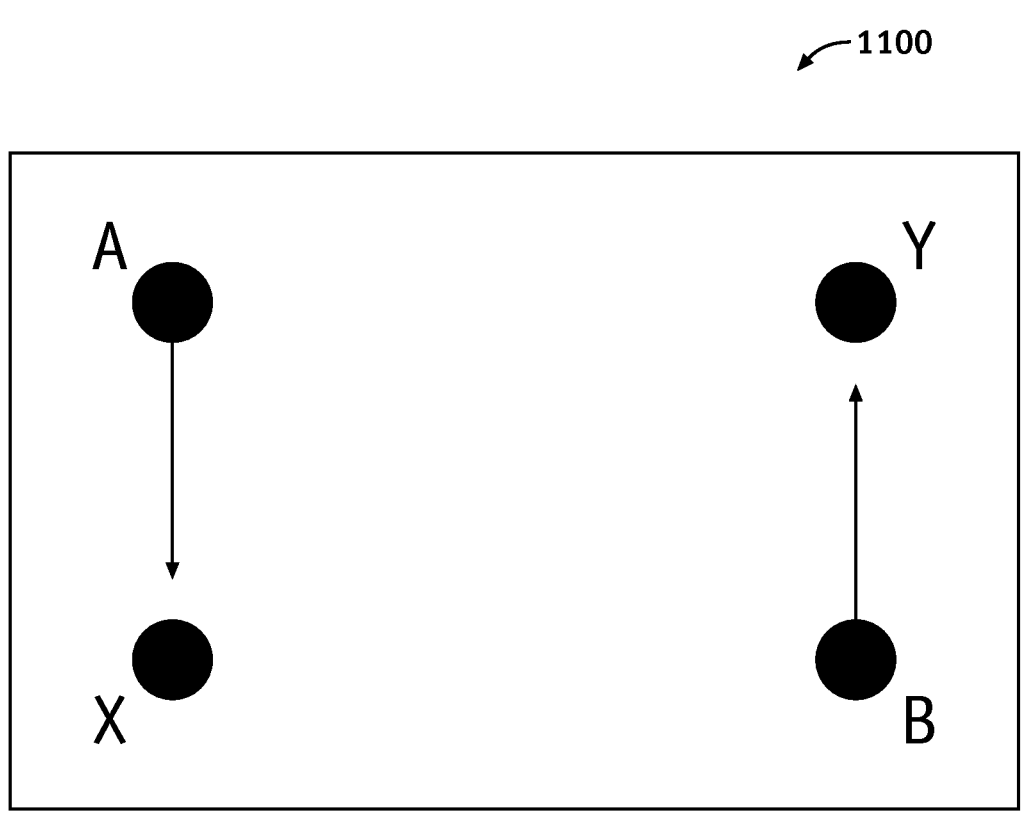
FIG. 11 is an illustration of an exemplary two point touch location change to a new location on a multi-touch interface according to an embodiment of the disclosure.
Figure 12:
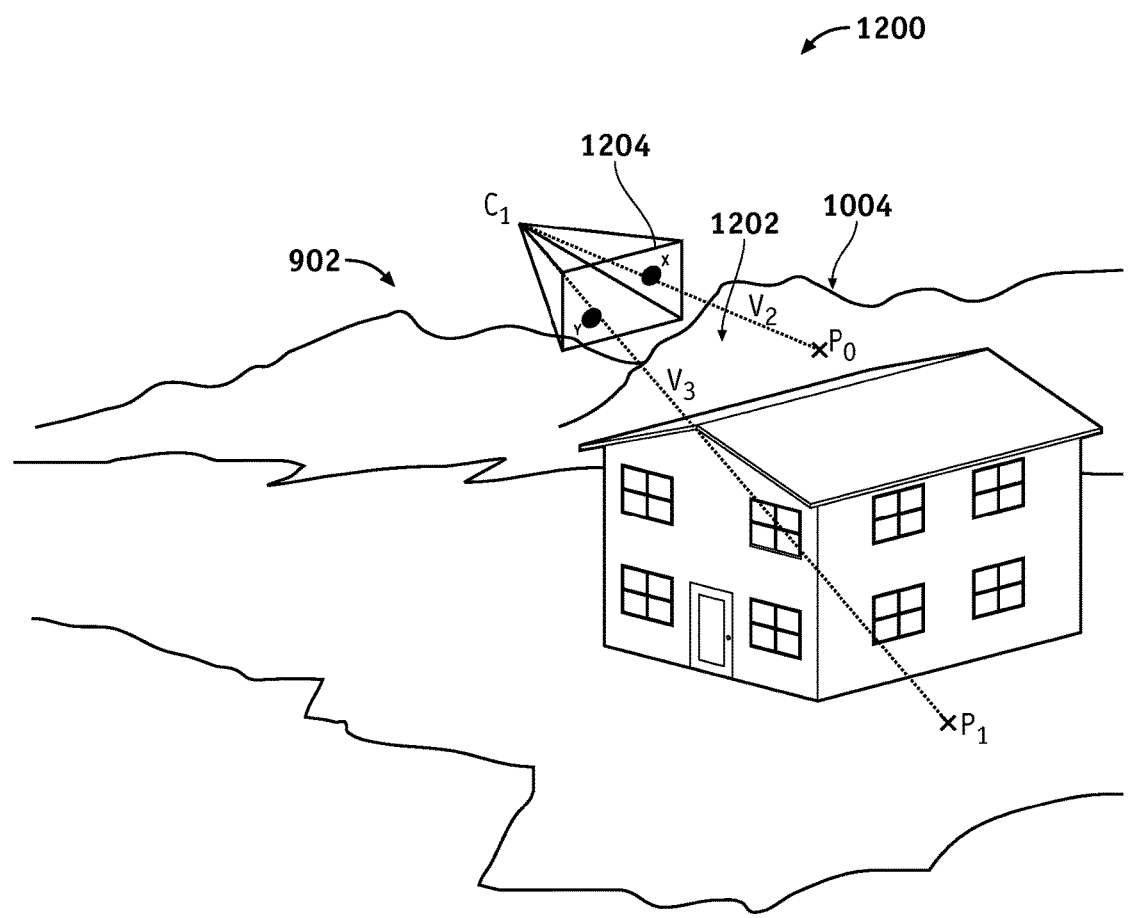
FIG. 12 is an illustration of an exemplary two point vector extrapolation from the new location of FIG. 11 according to an embodiment of the disclosure.

Process 800 is described below in connection with FIGS. 9-12. FIG. 9 is an illustration of an exemplary two point multi-touch in a 3-D environment 900 according to an embodiment of the disclosure. FIG. 10 is an illustration of an exemplary two point vector extrapolation from the interface 712 in a 3-D environment 1000 according to an embodiment of the disclosure. FIG. 11 is an illustration of an exemplary two point touch location A and B change to a new location X and Y respectively on the touch sensitive screen 714 according to an embodiment of the disclosure. FIG. 12 is an illustration of an exemplary two point vector extrapolation from the new location X and Y of FIG. 11 according to an embodiment of the disclosure.

Process 800 may begin by receiving a first touch on the interface 712 (user interface) (task 802). For example, as shown in FIG. 9 a scene 902 is rendered on the touch sensitive screen 714 of the interface 712, and 2-D locations of the first touch such as each 2-D touch point/location A and B are acquired by the interface 712. Process 800 is an exemplary process for manipulating a 3-D view of the scene 902 using the first touch at the two 2-D touch points A and B, however the process 800 can also be used to manipulate views of the scene 902 using one or more touches at one or more 2-D touch points.

Although a touch is used on the touch sensitive screen 714, the interface 712 is not limited to receiving a touch. Alternatively, any one or more input sources such as, for example but without limitation, two mice (e.g., with appropriate software to individually read a location of each of the two mice, as some operating systems may combine pointer inputs to move a single pointer), gesture based device activation, and the like, may be used for sending input to the interface 712.

Process 800 may continue by the vector extrapolator 708 extrapolating the first touch/input at the 2-D touch points A and B into the 3-D environment (3-D space) to provide a first 3-D vector extrapolation (task 804). For example, as shown in FIG. 10 a position, an orientation, and a frustum 1002 of a view 1006 (viewing perspective 1006) is used to render the view 1006 based on a camera location $C_0$ and extrapolate the 2-D touch points A and B into the scene 902. In this manner, the 2-D touch points A and B are extrapolated into the scene 902 to produce the first 3-D vector extrapolation comprising vectors $V_0$ and $V_1$ on a boundary of the frustum 1002. As mentioned above, a frustum is a portion of a virtual solid (e.g., a cone or pyramid) that lies between two parallel planes intersecting the virtual solid. Frustum is commonly used in computer graphics to describe a three-dimensional region visible on a screen.

Process 800 may continue by the interface 712 locating at least one virtual touch point ($P_0$ and $P_1$) on the 3-D environment 1000 based on the first 3-D vector extrapolation (task 806). In this manner, as shown in FIG. 10 the vectors $V_0$ and $V_1$ are intersected with the 3-D environment 1000 to produce the virtual touch points $P_0$ and $P_1$ corresponding to end points of the vectors $V_0$ and $V_1$ respectively. In this example, the virtual touch points $P_0$ and $P_1$ are locations on a ground 1004.

Process 800 may continue by the interface 712 receiving a relocation of a first location (A and B) of the first input on the interface 712 to a second input location (X and Y) on the interface 712 (task 808). In this manner, the interface 712 acquires new 2-D locations (second input location X and Y) of the first input (originally captured 2-D touch points/the first location A and B) from the interface 712. The originally captured 2-D touch points A and B are tracked as a continuous drag operation where a touch point is not lifted, but rather dragged, from the originally captured 2-D touch points A and B to their new 2-D touch points/second input location X and Y respectively. Similarly, a click and drag operation may be performed by a mouse.

Process 800 may continue by extrapolating the second input location X and Y into a 3-D space to provide a second 3-D vector extrapolation (task 810). For example, as shown in FIG. 12, using a viewing frustum 1202 of a view 1204 to vector extrapolate the new 2-D touch points/second input location X and Y into the scene 902 produces the second 3-D vector extrapolation comprising new vectors $V_2$ and $V_3$. The new vectors $V_2$ and $V_3$ comprise a first set of end points corresponding to the new 2-D touch points/second input location X and Y respectively, and a second set of end points corresponding to the virtual touch points $P_0$ and $P_1$ respectively. As discussed above, the virtual touch points $P_0$ and $P_1$ correspond to end points of the first 3-D vector extrapolation of the vectors $V_0$ and $V_1$. In this manner, the second 3-D vector extrapolation is calculated based on the first 3-D vector extrapolation.

Process 800 may continue by determining the viewing frustum 1202 of a virtual camera to keep a point in the 3-D space (e.g., the virtual touch points $P_0$ and $P_1$) underneath (i.e., a point on a 2-D interface covers a view of a point in a 3-D environment) a location of the first touch/input (e.g., the first location/touch points (A and B) and the second input location/new 2-D touch points (X and Y)) on the user interface when the location of the touch/input moves on the user interface 712 (task 812). A characteristic of the viewing frustum 1202/1002 may comprise, for example but without limitation, a virtual direction of the virtual camera, a virtual location of the virtual camera, and the like. Given constraints of virtual touch points $P_0$ and $P_1$, vectors $V_2$ and $V_3$, and intrinsic (frustum) properties of the view, a new virtual camera location $C_1$ is computed such that vectors $V_2$ and $V_3$ intersect the virtual touch points $P_0$ and $P_1$, thereby keeping the virtual touch point (e.g., virtual touch points $P_0$ and $P_1$) under the touched location (e.g., the first location/touch points (A and B) and the second input location/new 2-D touch points (X and Y)).

Computing a camera location (viewing perspective) such as the new virtual camera location $C_1$ given a set of constraints may be solved by methods, such as but without limitation, linear programming, Cholesky decomposition, LU decomposition, and the like. In some cases, these constraints alone may not be enough to solve a unique camera location so additional constraints on the camera position and/or orientation can be added. In the above example, a height above the ground 1004 and roll of a camera may be carried over from the original camera location $C_0$ to help constrain the new virtual camera location $C_1$.

Process 800 may continue by the perspective locator 710 relocating a viewing perspective (view 1204) based on the second 3-D vector extrapolation that is calculated based on the first 3-D vector extrapolation (task 814). A user may manipulate a 3-D virtual construct such as but without limitation, a terrain surface, a CAD drawing, a games space, and the like based on the second 3-D vector extrapolation.

In various embodiments described above, two 2-D touch points A and B are used as an example to extend the 2-D navigation gestures/input received by the interface 712 for use in the 3-D virtual environment. However, in other embodiments one or more 2-D touch points can be used. For example, a single 2-D touch point dragged to a new location can produce the values $P_0$ and $V_2$ requiring additional equation constraints from the original camera location $C_0$ and/or orientation to uniquely solve a constrained equation for the new camera location $C_1$ and orientation. For this example, a complete orientation and height above the ground 1004 may be used from the original camera location $C_0$, allowing the new camera location to only translate perpendicular to the ground 1004. For another example, three or more 2-D touch points can help to constrain the solution to the new camera location $C_1$ further, requiring fewer parameters from the original camera to be carried over.

In this way, a system and method is provided for extending 2-D navigation gestures for use in 3-D navigation.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-7 and 9-12 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for multi-input 3-D environment navigation, the method comprising:
   extrapolating by action of a processor a first input on a user interface into a 3-D space to provide a first 3-D vector extrapolation from a virtual camera location, a viewing frustum rendering a viewing perspective of the 3-D space based on the virtual camera location; and
   relocating by action of the processor the viewing perspective of the 3-D space based on a second 3-D vector extrapolation calculated based on the first 3-D vector extrapolation, wherein:
   the first input comprising a single finger pan translates the viewing frustum in a 2-D translation while keeping a camera zoom and orientation of the virtual camera location fixed, and
   the first input comprising a two point touch causes vector extrapolation of two touch points on the user interface into the 3-D space at virtual touch points in the 3-D space and the virtual touch points remain under the two touch points when the two touch points are moved relative to each other and to the user interface, wherein moving a first touch point to a first moved touch point and moving a second touch point to a second moved touch point causes execution of a view manipulation comprising a 3-D rotation, a 3-D translation, and a 3-D resizing.

2. The method according to claim 1, further comprising receiving the first input on the user interface, wherein the user interface comprises a device separate from the viewing frustum.

3. The method according to claim 1, wherein the first input comprises a touch.

4. The method according to claim 1, further comprising determining the viewing frustum of a virtual camera to keep a first point in the 3-D space underneath a location of the first input on the user interface when the location of the first input moves on the user interface.

5. The method according to claim 1, further comprising receiving a relocation of a first location of the first input on the user interface to a second input location on the user interface.

6. The method according to claim 5, further comprising extrapolating the second input location into the 3-D space to provide the second 3-D vector extrapolation.

7. The method according to claim 6, further comprising manipulating a 3-D virtual construct based on the second 3-D vector extrapolation.

8. The method according to claim 1, further comprising navigating the 3-D space using a set of single and multi-input gestures.

9. A multi-input 3-D environment device comprising:
   a processor;
   a user interface comprising an input device that receives a first input;
   a vector extrapolator that extrapolates by action of the processor the first input on the user interface into a 3-D space to provide a first 3-D vector extrapolation from a virtual camera location, a viewing frustum rendering a viewing perspective of the 3-D space based on the virtual camera location; and
   a perspective locator that relocates by action of the processor the viewing perspective of the 3-D space based on a second 3-D vector extrapolation calculated based on the first 3-D vector extrapolation, wherein:
   the first input comprising a single finger pan translates the viewing frustum in a 2-D translation while keeping a camera zoom and orientation of the virtual camera location fixed, and
   the first input comprising a two point touch causes vector extrapolation of two touch points on the user interface into the 3-D space at virtual touch points in the 3-D space and the virtual touch points remain under the two touch points when the two touch points are moved relative to each other and to the user interface, wherein moving a first touch point to a first moved touch point and moving a second touch point to a second moved touch point causes execution of a view manipulation comprising a 3-D rotation, a 3-D translation, and a 3-D resizing.

10. The multi-input 3-D environment device according to claim 9, wherein:
    the user interface comprises a touch sensitive screen configured to receive the first input comprising a touch; and
    the multi-input 3-D environment device is configured to implement the single finger pan by:
    receiving the first input on the user interface;
    extrapolating the first input into the 3-D space to provide the first 3-D vector extrapolation using the vector extrapolator; and
    relocating the viewing perspective based on the second 3-D vector extrapolation calculated based on the first 3-D vector extrapolation using the perspective locator.

11. The multi-input 3-D environment device according to claim 9, wherein the first input comprises a touch.

12. The multi-input 3-D environment device according to claim 9, wherein the vector extrapolator determines the viewing frustum of a virtual camera keeping a first point in the 3-D space underneath a location of the first input on the user interface when the location of the first input moves on the user interface.

13. The multi-input 3-D environment device according to claim 9, wherein the vector extrapolator extrapolates a second input location into the 3-D space to provide the second 3-D vector extrapolation.

14. The multi-input 3-D environment device according to claim 13, wherein the perspective locator manipulates a 3-D virtual environment based on the second 3-D vector extrapolation.

15. A 3-D environment manipulation system comprising:
    a processor;
    a vector extrapolator operable to extrapolate by action of the processor an input on a user interface into a 3-D space to provide a 3-D vector extrapolation from a virtual camera location, a viewing frustum rendering a viewing perspective of the 3-D space based on the virtual camera location; and a perspective locator operable to relocate by action of the processor the viewing perspective of the 3-D space based on the 3-D vector extrapolation, wherein:

the first input comprising a single finger pan translates the viewing frustum in a 2-D translation while keeping a camera zoom and orientation of the virtual camera location fixed, and the first input comprising a two point touch causes vector extrapolation of two touch points on the user interface into the 3-D space at virtual touch points in the 3-D space and the virtual touch points remain under the two touch points when the two touch points are moved relative to each other and to the user interface, wherein moving a first touch point to a first moved touch point and moving a second touch point to a second moved touch point causes execution of a view manipulation comprising a 3-D rotation, a 3-D translation, and a 3-D resizing.

16. The system according to claim 15, further comprising an interface operable to receive the input.

17. The system according to claim 16, wherein the interface comprises at least one interface selected from the group consisting of: a touch sensitive screen, a mouse, and a gesture based device.

18. The system according to claim 15, wherein the input comprises a touch.

19. The system according to claim 15, wherein the vector extrapolator is further operable to determine the viewing frustum of a virtual camera to keep a virtual touch point underneath a location of the input on an interface when the location of the input moves on the interface.

20. The system according to claim 19, wherein the viewing frustum comprises at least one characteristic selected from the group consisting of: a virtual direction of a virtual camera, and a virtual location of a virtual camera.

21. The system according to claim 15, wherein perspective locator is further operable to manipulate a 3-D virtual environment based on the 3-D vector extrapolation.

22. The system according to claim 15, wherein navigating the 3-D space comprises using a set of single and multi-input gestures.

* * * * *